March 26, 1968        J. D. BAUGHER        3,375,435
CONSTANT CURRENT REGULATOR AND VOLTAGE SENSING CIRCUIT
Filed March 8, 1966

INVENTOR
John D. Baugher.
BY
Wood, Herron & Evans.
ATTORNEYS.

United States Patent Office 3,375,435
Patented Mar. 26, 1968

3,375,435
CONSTANT CURRENT REGULATOR AND VOLTAGE SENSING CIRCUIT
John D. Baugher, Little Silver, N.J., assignor to The Rowan Controller Company, Westminster, Md., a corporation of Maryland
Filed Mar. 8, 1966, Ser. No. 532,633
5 Claims. (Cl. 323—4)

This invention relates to an electrical circuit wherein two or more resistances are connected in parallel and wherein the effect of unknown or variable resistance in series with each of the resistances is eliminated in the measurement or determination of the circuit parameters.

The invention has particular application to a constant current power supply wherein the desired load current is determined by the selection of one or more known parallel connected calibrated resistances through which the load current passes. These resistances are adapted to be switched in and out of the circuit by means of electrical contacts associated with relays or by solid state switches. The functioning of the power supply requires an accurate sensing of the voltage drop across the paralleled resistances. Where the ohmic value of the paralleled resistances is small, the resistance of the switching means in series with the calibrated resistances can be a substantial percentage of the calibrated resistances and will therefore produce a substantial percentage error in the sensed voltage drop across the resistances.

The objective of the present invention, therefore, has been to provide a voltage sensing circuit including two or more known resistances connected in parallel by switches, the circuit having means for detecting the voltage drop across the paralleled resistances which eliminates the effect of the resistance of the connecting switches.

More specifically, the objective of the invention has been to provide a circuit as described above in which the detecting means comprises a summation resistance associated with each of the known or calibrated resistances and connected on one side to a common point and on the other side to a point between the calibrated resistance and its switch, the ratio of the ohmic values of each summation resistance to its calibrated resistance being the same.

The objective of the invention will become more readily apparent from the following detailed description taken in conjunction with the accompanying drawings in which.

Figure 1:
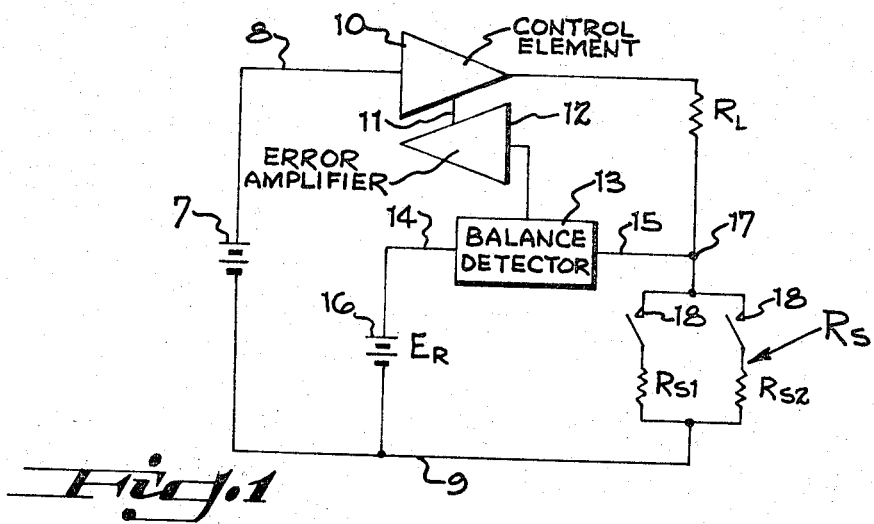
FIG. 1 is a circuit diagram of a constant current power supply.

In FIG. 1, a constant current power supply is illustrated diagrammatically. In this circuit, it is desired to supply a regulated current to a load $R_L$ from an unregulated power supply 7 which is connected to the load $R_L$ by positive output line 8 and negative output line 9. The circuit to the load includes in series with the positive line 8 a control element 10 such as a transistor whose base is connected through line 11 and an amplifier 12 to a balance detector 13. The balance detector has input leads 14 and 15 which are connected respectively to a reference voltage source 16 and a sensing point 17 between the load resistance $R_L$ and a sensing resistance $R_S$. The reference voltage and the sensing resistance are connected on their other sides to the power supply 7 through negative line 9. The sensing resistance $R_S$ is shown as two parallel calibrated resistances $R_{S1}$ and $R_{S2}$, each having a series connected switching contact 18. The circuit described above, and variations of it, is well known in the art.

In the operation of this circuit, normally no current flows out of the sensing point 17 to the balance detector 13. Should the voltage relationships change so that there is a flow of current between the balance detector and the sensing point 17, the condition is cured through the application of an error signal on the control lead 11 of the control element 10. This signal changes the resistance of the control element to correct the condition of unbalance. Since in normal operation there is no flow of current from the sensing point to the balance detector, the current in the load $R_L$ is the same as that through the sensing resistance $R_S$. The current through the sensing resistance must create a drop across the sensing resistance equal to the reference voltage ($E_R$) at 16 for otherwise the balance detector would react to a state of unbalance. Otherwise expressed, $$I_L R_S = E_R$$

It will be observed from this equation that the current through the load can be selected and changed by changing the sensing resistance and if the reference voltage is known and the value of the sensing resistance is known, the load current can also be determined through the equation above.

The accurate determination of the load current is dependent upon the detection of the true drop across the sensing resistance. If the sensing point 17 also detected the drop across the contact resistance through which the sensing resistance is brought into the circuit, the true equation would be $E_R = I_L (R_S + R_C)$ where $R_C$ is the contact resistance. Thus, the load current would be different from its intended value by an error introduced by the contact resistance associated with the sensing resistance. If the sensing resistance is several thousand ohms, then a few milliohms of contact resistance is inconsequential. However, if the sensing resistance is one ohm or less than a contact resistance of several milliohms, it becomes a significant error.

Figure 2:
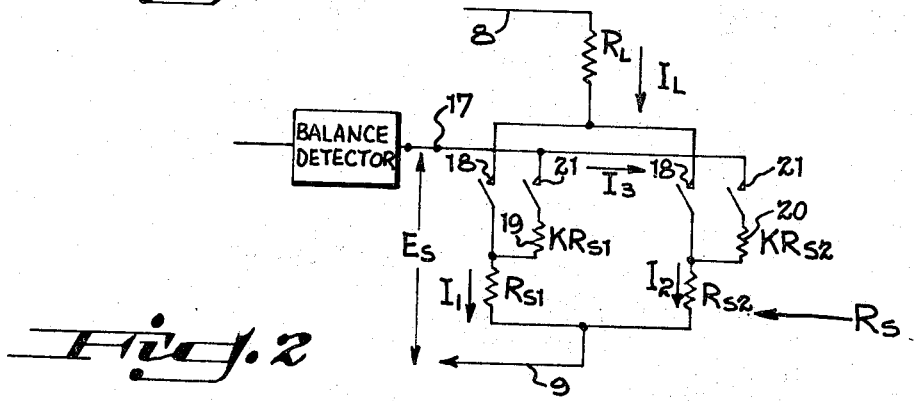
FIG. 2 is a circuit diagram of the voltage sensing circuit in accordance with the invention.

The error introduced by the resistance of the switching contact 18 can be eliminated by modifying the circuit of FIG. 1 as illustrated in FIG. 2. As shown in FIG. 2, the sensing point 17 is connected to the sensing resistance $R_S$ through summation resistances 19 and 20. Each summation resistance is connected on one side to the common sensing point 17 through a switch contact 21 whose resistance is very small compared to the resistance value of the summation resistance. The other side of each summation resistance is connected to its respective sensing resistance element at a point between the contact 18 and the resistance element. In other words, summation resistance 19 is connected between contact 18 and calibrated resistance $R_{S1}$ and summation resistance 20 is connected between contact 18 and calibrated resistance $R_{S2}$. The ratio of the ohmic value of the summation resistance 19 to that of calibrated resistance $R_{S1}$ is the same as the ratio of the ohmic value of summation resistance 20 to that of calibrated resistance $R_{S2}$. That ratio could be 100:1 or 1,000:1, for example. A large absolute value of the summation resistance is preferred so that the error produced by the resistance of its switch contact is de minimus.

By connecting the sensing point to the calibrated resistances as described above, the effect of the resistance of the switch means as, for example, the contact 18 is eliminated and the voltage applied at the sensing point 17 is equal to the product of the load current $I_L$ and the value of the paralleled resistances $R_{S1}$ and $R_{S2}$ or, as otherwise, $$E_S = I_L \frac{(R_{S1} \cdot R_{S2})}{R_{S1} + R_{S2}}$$

That this relationship is true can be demonstrated as follows:

Assume that there is no current flowing into the sensing point 17, for this is a normal condition of operation.

Summing the voltage drops from the sensing point 17 to line 9 through one of the summation resistances:

$$I_L = I_1 + I_2$$
$$E_S = I_3 K R_{S2} + I_2 R_{S2}$$
$$I_3 = \frac{I_1 R_{S1} - I_2 R_{S2}}{K(R_{S1} + R_{S2})}$$

Substituting:

$$E_S = \frac{I_1 R_{S1} - I_2 R_{S2}}{K(R_{S1} + R_{S2})} K R_{S2} + I_2 R_{S2}$$

$$= \frac{I_1 R_{S1} R_{S2} - I_2 R^2_{S2}}{R_{S1} + R_{S2}} + I_2 R_{S2} \cdot \frac{R_{S1} + R_{S2}}{R_{S1} + R_{S2}}$$

$$= \frac{I_1 R_{S1} R_{S2} - I_2 R^2_{S2}}{R_{S1} + R_{S2}} + \frac{I_2 R_{S2} R_{S1} + I_2 R^2_{S2}}{R_{S1} + R_{S2}}$$

$$= \frac{I_1 R_{S1} R_{S2} - I_2 R^2_{S2} + I_2 R_{S2} R_{S1} + I_2 S^2_{S2}}{R_{S1} + R_{S2}}$$

$$= \frac{R_{S1} R_{S2}(I_1 + I_2)}{R_{S1} + R_{S2}}$$

$$= \frac{R_{S1} R_{S2}}{R_{S1} + R_{S2}} \cdot I_L$$

From these equations, it can be seen that there are several important conditions which must be observed in the sensing circuit of the present invention. The summation resistances must be large compared to the resistance of the contact 21 so that the resistance of the contact 21 will not introduce any error into the circuit. Further, all of the summation resistances must be related to their respective calibration resistances by the same constant of proportionality. That is to say, if the summation resistance 19 has ten times the ohmic value of calibrated resistance $R_{S1}$, then summation resistance 20 must have ten times the ohmic value of its associated calibrated resistance $R_{S2}$. The constant of proportionality K is ten and drops out of the algebraic equations set forth above.

Figure 3:
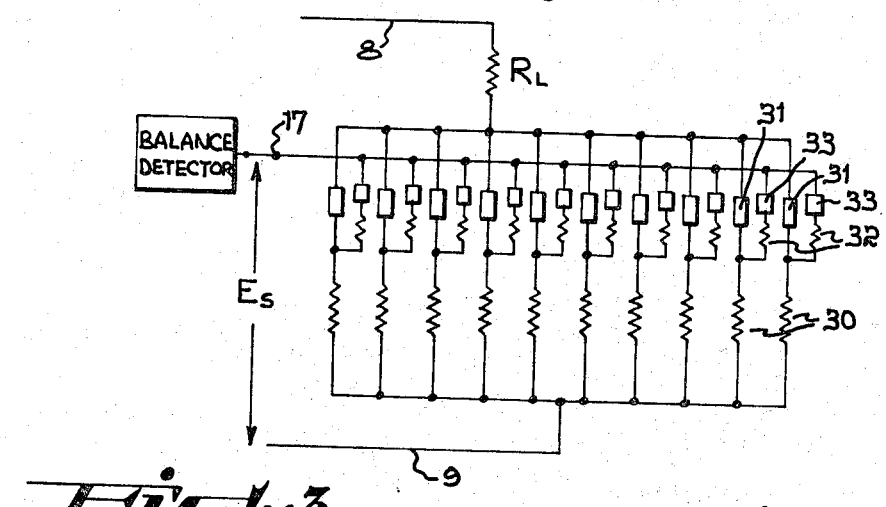
FIG. 3 is a circuit diagram of a voltage sensing circuit using more than two paralleled resistances.

For simplicity, the sensing circuit has been illustrated as applied to two resistances in parallel. In practice, the sensing resistance would be constituted by one or more decades of resistances as illustrated in FIG. 3. There, it can be seen that the connection of the sensing point to the paralleled resistors is through respective summation resistances in a manner identical to that of FIG. 2. In this figure, the calibrated resistances indicated at 30 are connected in the circuit by solid state switching devices indicated at 31. The summation resistances indicated at 32 are likewise connected into the circuit by solid state switching devices 33. Thus, where it had been the practice in prior circuits of this type to use cumbersome relays because of the low resistance contacts, through the present invention it is possible to use the more convenient solid state switches even though they have a relatively high series resistance value. The resistance value of the switches 31 drops out of consideration for the reasons analyzed in connection with the equations set forth above. The resistance values of the devices 33 can be made quite small with respect to the ohmic values of the calibrated resistances 32 so that their effect on the accuracy of the circuit is inconsequential.

I claim:
1. A voltage sensing circuit comprising,
   a source of current, having two output lines,
   at least two calibrated resistances connected in parallel to said current source,
   switch means in series with each resistance and between said resistance and one output line of said source,
   a summation resistance associated with each said calibrated resistance,
   said summation resistances being connected on one side to a common sensing point and on the other side to a point between the respective calibrated resistance and its switch means,
   the ratios of the ohmic values of said summation resistances to their respective calibrated resistances being the same.

2. A voltage sensing circuit according to claim 1 further comprising switch means for selectively connecting said summation resistances in circuit,
   the ohmic value of said summation resistances being large compared to the series resistance of its respective switch means.

3. A voltage sensing circuit according to claim 1 in which said switch means comprise solid state devices.

4. A voltage sensing circuit according to claim 1 in which the ohmic value of each said summation resistance is large compared to its respective said calibrated resistance.

5. In a constant current power supply having a source of current, output lines connected to said source of current, current control means connected in series in one of said lines, a load and a sensing resistance connected in series and across said output lines, said sensing resistance including plural resistors connected through series switch means in parallel relation, a reference voltage source connected to said other line, a balance detector having input leads connected to said reference voltage and between said load and sensing resistance and an output lead connected to said control means, the improvement in the connection of the balance detector to said sensing resistance comprising,
   plural summation resistances, each connected on one side respectively to a sensing resistor between the resistor and its switch means,
   means connecting the other side of said summation resistances to each other and to said balance detector,
   the ratios of the ohmic values of said summation resistances to their sensing resistors being the same.

References Cited

UNITED STATES PATENTS

| | | | |
|---|---|---|---|
| 2,509,262 | 5/1950 | Cohen | 323—74 X |
| 2,999,202 | 9/1961 | Ule | 323—74 |
| 3,267,355 | 8/1966 | Dranetz | 323—80 |
| 3,317,703 | 5/1967 | Gilbert | 323—22 X |

JOHN F. COUCH, *Primary Examiner.*

W. E. RAY, *Assistant Examiner.*